United States Patent [19]

Holmes

[11] 4,197,703

[45] Apr. 15, 1980

[54] EXHAUST SYSTEM FOR STRADDLE CARRIER ENGINES

[75] Inventor: William K. Holmes, Schofield, Wis.

[73] Assignee: J. I. Case Company, Racine, Wis.

[21] Appl. No.: 899,518

[22] Filed: Apr. 24, 1978

[51] Int. Cl.² .......................... F01N 5/04; B60P 3/00
[52] U.S. Cl. ...................................... 60/319; 414/460
[58] Field of Search ................. 60/274, 283, 308, 317, 60/319; 214/394

[56] References Cited

U.S. PATENT DOCUMENTS

| | | | |
|---|---|---|---|
| 1,766,900 | 6/1930 | Griswold | 60/319 |
| 2,130,385 | 9/1938 | Fluor | 60/319 |
| 3,050,376 | 8/1962 | Bishop | 60/308 |
| 3,181,717 | 5/1965 | Kumferman | 214/394 |
| 3,186,511 | 6/1965 | Kliewer | 60/319 |
| 3,232,373 | 2/1966 | Bjork | 60/283 |
| 3,285,709 | 11/1966 | Eannarino | 60/283 |
| 3,306,034 | 2/1967 | Boyd | 60/283 |
| 3,470,689 | 10/1969 | Gurr | 60/283 |
| 4,119,229 | 10/1978 | Holmes | 214/394 |

FOREIGN PATENT DOCUMENTS 644765 7/1962 Canada ...................................... 60/317

*Primary Examiner*—Douglas Hart
*Attorney, Agent, or Firm*—Dressler, Goldsmith, Shore, Sutker & Milnamow, Ltd.

[57] ABSTRACT

An exhaust system for withdrawing exhaust gases as well as combustion materials from a crankcase of an engine for a U-shaped straddle carrier includes an engine exhaust line which as an exhaust outlet adjacent the engine and an elongated pipe extending from the outlet of the exhaust line to an area above the frame structure for the carrier. A tube leads from the crankcase vent outlet to the exhaust line and has an open end which is located within the line spaced inwardly from the exhaust outlet of the exhaust line. The enlarged pipe creates a venturi effect adjacent the outlet of the exhaust line which produces a negative pressure at the outlet end of the tube and sucks the combustible materials from the crankcase vent into the exhaust line where they are ignited by the high temperature exhaust gases and are burned before exiting from the enlarged pipe.

4 Claims, 2 Drawing Figures

EXHAUST SYSTEM FOR STRADDLE CARRIER ENGINES

BACKGROUND OF THE INVENTION

The present invention relates generally to engine exhaust systems and more particularly to an exhaust system for an engine that is utilized for powering a straddle carrier that consists of a large inverted U-shaped frame that defines a cargo carrying space between the legs of the U-shaped frame.

Various types of straddle carriers for transporting large containers which are on the order of twenty to forty feet long have been proposed. One such type of container that has recently been developed is disclosed in U.S. patent application Ser. No. 844,655, filed Oct. 25, 1977, which has been accepted in the industry as a significant major contribution in the area of cargo container carrying vehicles. One of the significant improvements that is incorporated into this type of vehicle is that the entire system is hydraulic and the various hydraulic drive components and control functions are powered by two separate engines. It will be appreciated that in this type of vehicle, the interconnecting web between the vertical legs of the U-shaped frame is located more than 20 feet above the ground level and the cab structure for the operator must of necessity be located above the horizontal web of frame 14 so that the operator has clear visibility of the container located in the cargo container bay during attachment and detachment of a spreader with the container.

One of the significant improvements from a commercial acceptance point of view of the straddle carrier disclosed in the above-identified application, is the fact that the respective engines are located at the lower end of the respective legs of the inverted U-shaped frame so the various major components are located in close proximity to the ground and the majority of the weight is close to the ground engaging wheels. For example, the unit disclosed in the above-identified application has a pair of pumps driven by each of the engines and one of the pumps of each pair supplies pressurized hydraulic fluid to a hydrostatic drive system that is associated with the wheels on an associated leg of the inverted U-shaped frame. A second pump of each pair supplies the hydraulic pressurized fluid to a hoisting cylinder that is associated with each leg of the inverted U-shaped carrier frame and other control functions. Thus, having all of these components in close proximity to the ground reduces the amount of extremely heavy duty flexible hosing that is necessary for connecting the respective pumps to the reservoir and to the various components that are supplied with pressurized hydraulic fluid.

One of the significant problems that had to be overcome with the innovative vehicle that was developed was the control of the exhaust gases from the respective engines which of necessity had to be exhausted at a level above the level of the cab structure in which the operator is located. To alleviate this problem, the unique straddle carrier disclosed in the above application incorporates an exhaust system wherein the exhaust gases are exhausted at a level above the cab for the vehicle without creating any undue back pressure into the engines for the vehicle. This is accomplished by having a very short exhaust line which has an outlet end in close proximity to the vehicle engine and an enlarged pipe having one end surrounding the outlet end of the exhaust line and being larger to produce an annular opening adjacent the exhaust outlet while the opposite end is located above the cab structure for the straddle carrier. The enlarged annular opening created a chimney effect for drawing air into the lower end of the enlarged pipe which produces a positive flow throughout the length of the enlarged pipe. In fact, it was determined that this type of exhaust system resulted in a lower back pressure to the engine than most conventional exhaust systems that are presently utilized with large engines of this type, which normally are diesel engines.

However, during use of this type of straddle carrier, one of the objections that was received from the operators was the fact that the crankcase ventilation, which included a drainpipe from the vent outlet of the crankcase towards the ground, resulted in nauseous fumes being located in an area surrounding the engine. In addition, the operators complained that many times combustible liquids were being deposited on the ground adjacent the vehicle as well as certain parts of the frame structure of the vehicle which not only is distasteful from an appearance standpoint, but more importantly could easily result in a fire hazard.

SUMMARY OF THE INVENTION

It has now been determined that the features of the basic exhaust system for the vehicle that is disclosed in the above-mentioned application can be utilized for disposing of all combustible fumes and liquids which emanate from the vent of the crankcase of each of the engines that are utilized for transporting and supplying the power functions for an inverted U-shaped straddle carrier. This can be accomplished with minimal modification of the basic unit which essentially amounts to relocation of a tubular member that is already incorporated into the basic vehicle.

More specifically, it has been determined that the combustible materials emanating from the vent of a crankcase can be diverted into the exhaust line adjacent the outlet thereof and the negative pressures created by the enlarged pipe and annular opening surrounding the exhaust outlet of the exhaust line will produce a fluid flow from the crankcase into the exhaust line at a point where the temperature of the exhaust gases is sufficient to ignite all of the combustible materials and burn these materials before they exit out of the outlet end of the enlarged pipe.

In the specific embodiment illustrated, a tube has one end connected to the crankcase vent and an opposite open end located in the exhaust line and spaced inwardly of the exhaust outlet. The opposite open end of the tube is preferably directed toward the exhaust outlet and the tube, exhaust line and enlarged pipe are circular and have their centers concentric with each other adjacent the exhaust outlet.

According to the method aspect of the invention, combustible materials from a crankcase of an engine are directed into an exhaust line having an outlet with exhaust gases flowing through the line so that the combustible materials are ignited by the exhaust gases and are burned before exiting from the exhaust pipe.

DETAILED DESCRIPTION

Figure 1:
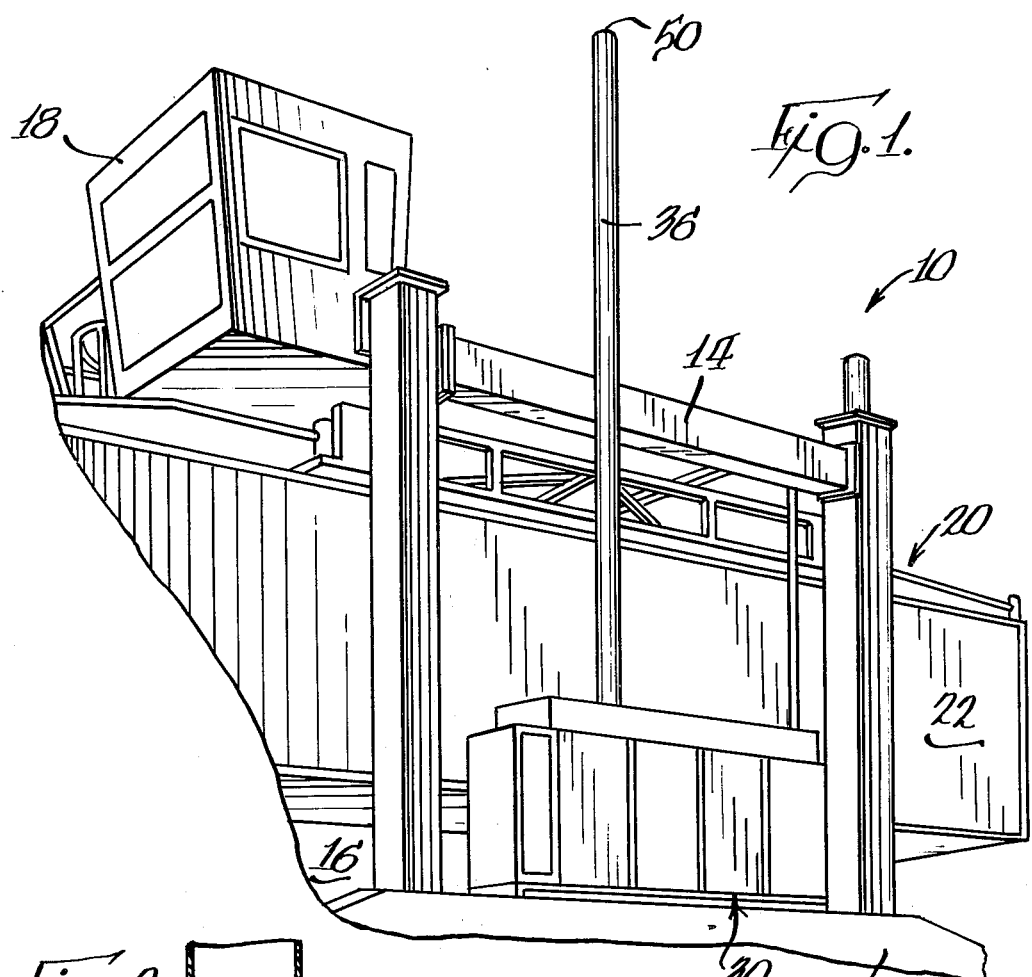
FIG. 1 is a fragmentary perspective view of a straddle carrier with an engine having the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings generally discloses a straddle carrier 10 of the type shown in the above identified application, which is incorporated herein by reference. Straddle carrier 10 consists of a generally inverted U-shaped frame that has a pair of generally vertical legs 12 (only one being shown) and an interconnecting portion 14 connecting the upper ends of the legs to define an open cargo bay 16. A cab structure 18 is supported on the upper horizontal frame portion 14 and a spreader 20 is adapted to be raised and lowered within the cargo or container bay 16. Spreader 20 is adapted to be connected to a container 22 for raising the container within the bay and transporting it from one site to another.

As disclosed in the above application, straddle carrier 10 includes two engine compartments 30 respectively located at the lower ends of each of the vertical legs 12 in close proximity to the drive wheels (not shown) for the vehicle. Each engine compartment 30 has an engine 32 located therein which may be a diesel type engine. Engine 32 has an exhaust line 34 leading therefrom through which heated exhaust gases pass for disposition into the atmosphere. Exhaust line 34 may have a muffler 35 located therein.

Because of various factors, it is necessary that the exhaust gases be directed to the atmosphere at a height above the cab structure 18 which in this instance is a substantial distance since the generally inverted U-shaped frame has a height of more than 30 feet. It was determined that extension of exhaust pipe such a large distance was not possible because it would develop extreme back pressures in the engine.

Therefore, the first vehicles of this type had a unique exhaust system incorporated therein which consists of an enlarged pipe 36 which has its lower end 38 located around the exhaust outlet 40 of exhaust line 34 and is held in spaced relation by connection elements 41. The pipe 36 has a diameter which is at least twice the diameter of exhaust line 34 which is also circular in cross section and the centers of the two pipes are concentric with each other to produce an annular opening 42 surrounding exhaust outlet 40. The opposite end 50 of pipe 36 is located at a point which is approximately at the upper level of cab structure 18 so that all exhaust gases passing therethrough are directed into the atmosphere above the level of the cab.

Actual use of the exhaust system of this type shows that the enlarged annular opening 42 surrounding exhaust outlet 40 will produce a chimney effect at the outlet of the exhaust line and will result in a negative pressure created at the exhaust outlet. This negative pressure will tend to draw the exhaust gases from the engine and produce an air flow within pipe 36 sufficient to have exhaust gases flow the entire length of the pipe and exit out the free end 50.

As was indicated above, the original straddle carrier of this type had the crankcase vent outlet 52 leading from valve cover 54 for engine 32 vented to the atmosphere adjacent the engine. This resulted in having fumes and liquids emanating from vent outlet 52 adjacent the lower end of inverted U-shaped frame, particularly legs 12; and created some problems.

It has now been determined that the same exhaust system that is already incorporated into existing vehicles can be utilized for effectively disposing of all combustible materials emanating from crankcase vent 52. According to the present invention, an elongated circular tube 56 has one end connected to vent opening 52 and has an opposite open end 58 located within exhaust line 34 and spaced inwardly slightly from exhaust outlet 40. The open end 58 of tube 56 is directed upwardly into the enlarged pipe and is located concentric with the center of circular tube or exhaust line 34.

Figure 2:
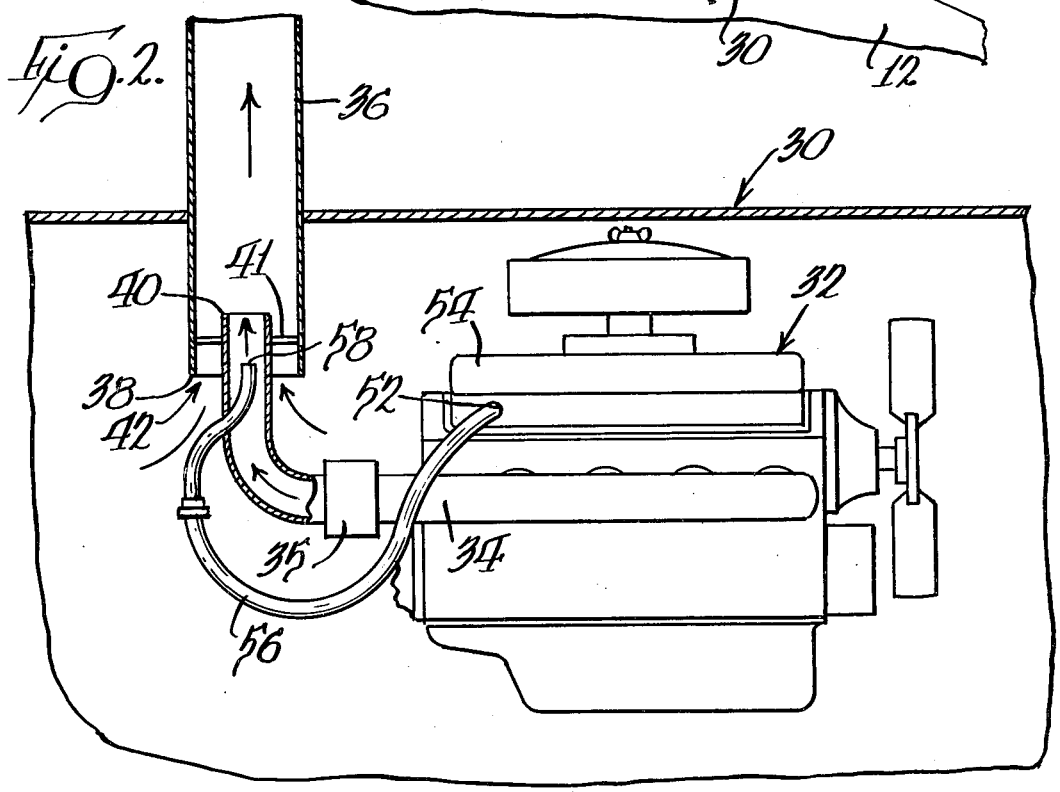
FIG. 2 is an enlarged fragmentary sectional view of the engine for the vehicle shown in FIG. 1.

It has been determined that by positioning the outlet end 58 of tube 56 as illustrated in FIG. 2, the negative pressures created at the exhaust outlet 40, combined with the venturi effect, will be sufficient to draw the combustible materials, which may include fumes and liquids, into the exhaust line. Also, the temperature of the exhaust gases flowing through exhaust line 34 will be sufficient to ignite the combustible fumes before they exit from exhaust outlet 40 and the combustible materials will burn before exiting from the opposite end of enlarged pipe 36.

In order to have a complete understanding of the present invention, a specific example will now be described. A J. I. Case, 6 cylinder, 4 stroke type diesel engine having an exhaust line 34 which has a diameter of 3.50 inches and a length of approximately 22.00 inches has an enlarged pipe 36 having a diameter of 5.00 inches surrounding exhaust outlet 40 so that there was an overlap of approximately 2.31 inches between the exhaust line and the enlarged pipe. A tube 56 having a diameter of 1.00 inches is positioned as illustrated in the drawings so that the outlet 58 is spaced from exhaust outlet 40 by a dimension of approximately 5.60 inches. With this arrangement all of the combustible fumes and other materials that would normally be deposited into the atmosphere from crankcase vent 52 are drawn into the exhaust line and are ignited by the temperature of the exhaust gases which is higher than the combustion temperature of the combustible materials and is on the order of 800 degrees F.

As can be appreciated from the above description, the present invention provides an extremely simple manner of disposing of combustible materials that emanate from a crankcase of an engine, which would normally be deposited into the atmosphere.

What is claimed is:

1. In combination with a straddle carrier having a generally inverted U-shaped frame including vertical legs and a connecting portion interconnecting upper ends of said legs to define an open cargo bay with an engine adjacent the lower end of at least one of said legs, said engine having an exhaust line having a vertical exhaust outlet and a crankcase with a vent, and a vertical pipe having one end surrounding said vertical exhaust outlet and defining an annular air inlet around said vertical exhaust outlet with the opposite end of said pipe located above said connecting portion of said frame, the improvement of tube means having one end connected to said crankcase vent and an opposite open end located vertically within said exhaust line adjacent said vertical exhaust outlet so that air flow is developed through said annular air inlet producing a negative pressure at said opposite open end of said tube means so that combustible materials are drawn from said crankcase into said exhaust line.

2. The combination as defined in claim 1, in which said opposite open end of said tube means is directed toward said exhaust outlet.

3. The combination as defined in claim 2, in which said exhaust line, pipe and tube are circular and said opposite open end is concentric with the center of said exhaust line and said pipe.

4. In combination with an engine having an exhaust line with a vertical exhaust outlet adjacent the engine and a crankcase with a combustible material vent; a tube having one end connected to said vent and an opposite open end, said opposite open end being located vertically inside said exhaust line and spaced inwardly from said vertical exhaust outlet, and an enlarged vertical pipe having one end surrounding and defining an annular opening adjacent said vertical exhaust outlet and an opposite free end, said annular opening defining an atmospheric air inlet which produces a negative pressure at the opposite open end of said vertical tube to induce flow of combustible materials through said vertical tube.

* * * * *